United States Patent
Huang

(10) Patent No.: US 7,032,784 B2
(45) Date of Patent: Apr. 25, 2006

(54) CAULKING GUN HAVING AN ADJUSTABLE HOOK

(76) Inventor: Wen-Sheng Huang, 58, Ma Yuan West St., Taichung (TW)

(*) Notice: Subject to any disclaimer, the term of this patent is extended or adjusted under 35 U.S.C. 154(b) by 291 days.

(21) Appl. No.: 10/652,427

(22) Filed: Aug. 29, 2003

(65) Prior Publication Data
US 2005/0045659 A1 Mar. 3, 2005

(51) Int. Cl.
*B67D 5/00* (2006.01)

(52) U.S. Cl. .............. 222/325; 222/180; 222/390; 222/391

(58) Field of Classification Search ........ 222/325–327, 222/390, 391
See application file for complete search history.

(56) References Cited

U.S. PATENT DOCUMENTS

| | | | | |
|---|---|---|---|---|
| 4,669,636 A | * | 6/1987 | Miyata | 222/153.01 |
| 5,871,106 A | * | 2/1999 | Oksa et al. | 211/70.6 |
| 6,220,485 B1 | * | 4/2001 | Chang | 222/174 |
| 6,375,051 B1 | * | 4/2002 | Iverson | 222/552 |
| 6,460,736 B1 | * | 10/2002 | D'Agostino | 222/146.5 |
| 6,926,177 B1 | * | 8/2005 | Scott et al. | 222/390 |

* cited by examiner

*Primary Examiner*—J. Casimer Jacyna

(57) ABSTRACT

A caulking gun includes a gun body, a connector secured on an end of the gun body, and a hanging hook adjustably positioned on the connector. Thus, the angle and position of the suspension portion of the hanging hook can be adjusted arbitrarily so as to fit the user's practical requirement. In addition, the positioning bosses of the hanging hook are positioned in the positioning holes of the connector, so that the hanging hook is combined with the connector rigidly and stably.

7 Claims, 9 Drawing Sheets

CAULKING GUN HAVING AN ADJUSTABLE HOOK

BACKGROUND OF THE INVENTION

1. Field of the Invention

The present invention relates to a caulking gun, and more particularly to a caulking gun having an adjustable hook.

2. Description of the Related Art

A conventional caulking gun in accordance with the prior art shown in FIGS. 8 and 9 comprises gun body 1 having an end formed with a groove 2, a hook 3 mounted on the gun body 1 and having a loop-shaped hanging portion 4 mounted in the groove 2 of the gun body 1, and a cover 5 secured on the hook 3 and the gun body 1 for retaining the hook 3 on the gun body 1. In practice, the hanging portion 4 of the hook 3 is hooked on the user's waist belt when not in use. In addition, the hook 3 can be rotated in the groove 2 of the gun body 1.

However, the hook 3 cannot be fixed on the gun body 1 rigidly and stably, so that the hook 3 is easily inclined forward or backward, thereby causing inconvenience to the user. In addition, the hook 3 is only available for the gun body having a circular groove as shown in FIG. 9 and is not available for the groove of any other shape, thereby limiting the versatility of the hook 3.

SUMMARY OF THE INVENTION

The primary objective of the present invention is to provide a caulking gun having an adjustable hook.

Another objective of the present invention is to provide a caulking gun, wherein the angle and position of the suspension portion of the hanging hook can be adjusted arbitrarily so as to fit the user's practical requirement.

A further objective of the present invention is to provide a caulking gun, wherein the positioning bosses of the hanging hook are positioned in the positioning holes of the connector, so that the hanging hook is combined with the connector rigidly and stably.

A further objective of the present invention is to provide a caulking gun, wherein the hanging hook is combined with the connector easily and conveniently, thereby facilitating the user adjusting the angle and position of the suspension portion of the hanging hook.

A further objective of the present invention is to provide a caulking gun, wherein the connector and the hanging hook are mounted on the gun body easily and conveniently, thereby facilitating the user mounting the parts.

In accordance with the present invention, there is provided a caulking gun, comprising:

a gun body;

a connector secured on an end of the gun body; and a hanging hook adjustably positioned on the connector.

Further benefits and advantages of the present invention will become apparent after a careful reading of the detailed description with appropriate reference to the accompanying drawings.

DETAILED DESCRIPTION OF THE INVENTION

Figure 1:
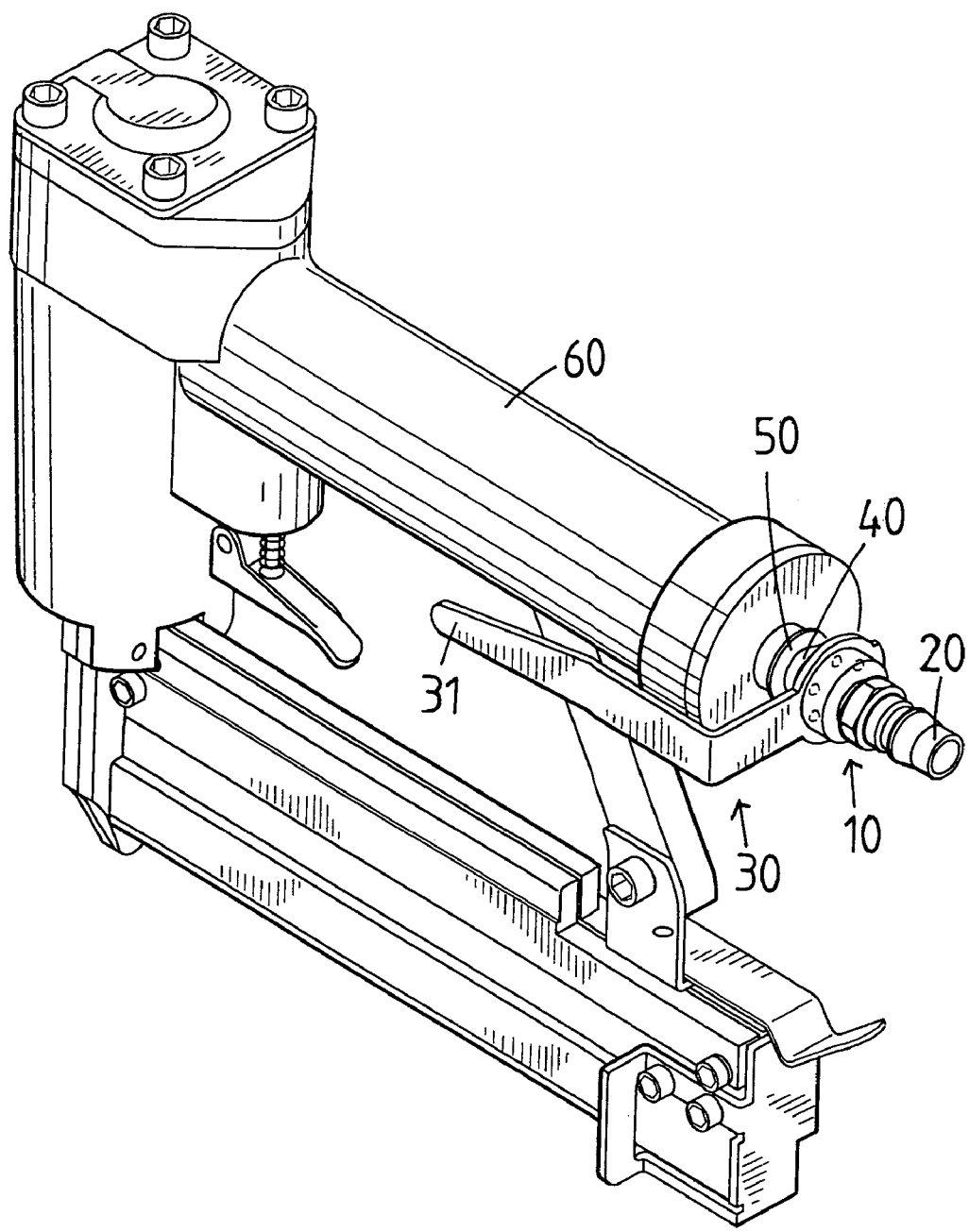
FIG. 1 is a perspective view of a caulking gun in accordance with the preferred embodiment of the present invention.
Figure 2:
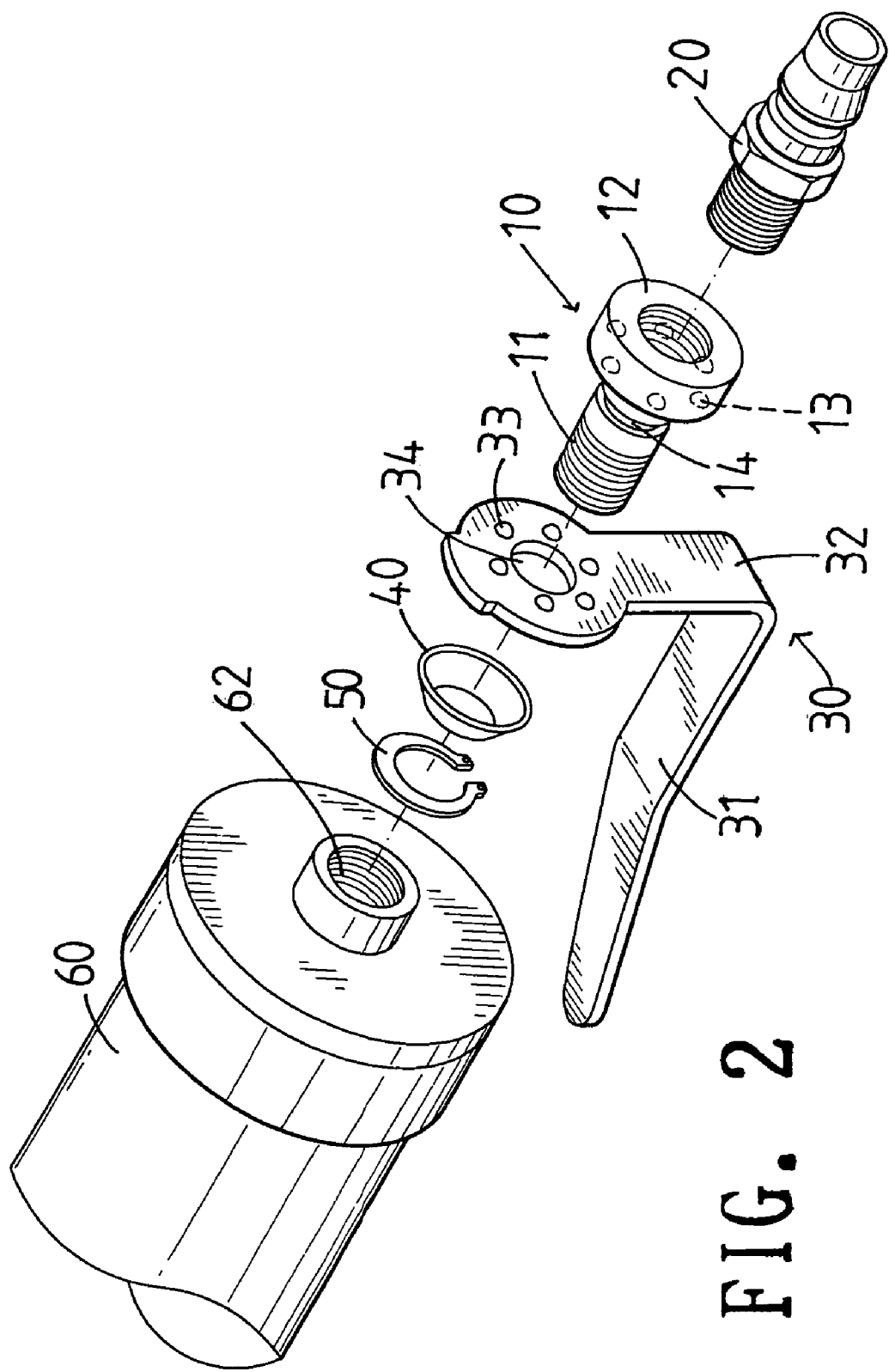
FIG. 2 is an exploded perspective view of the caulking gun as shown in FIG. 1.
Figure 3:
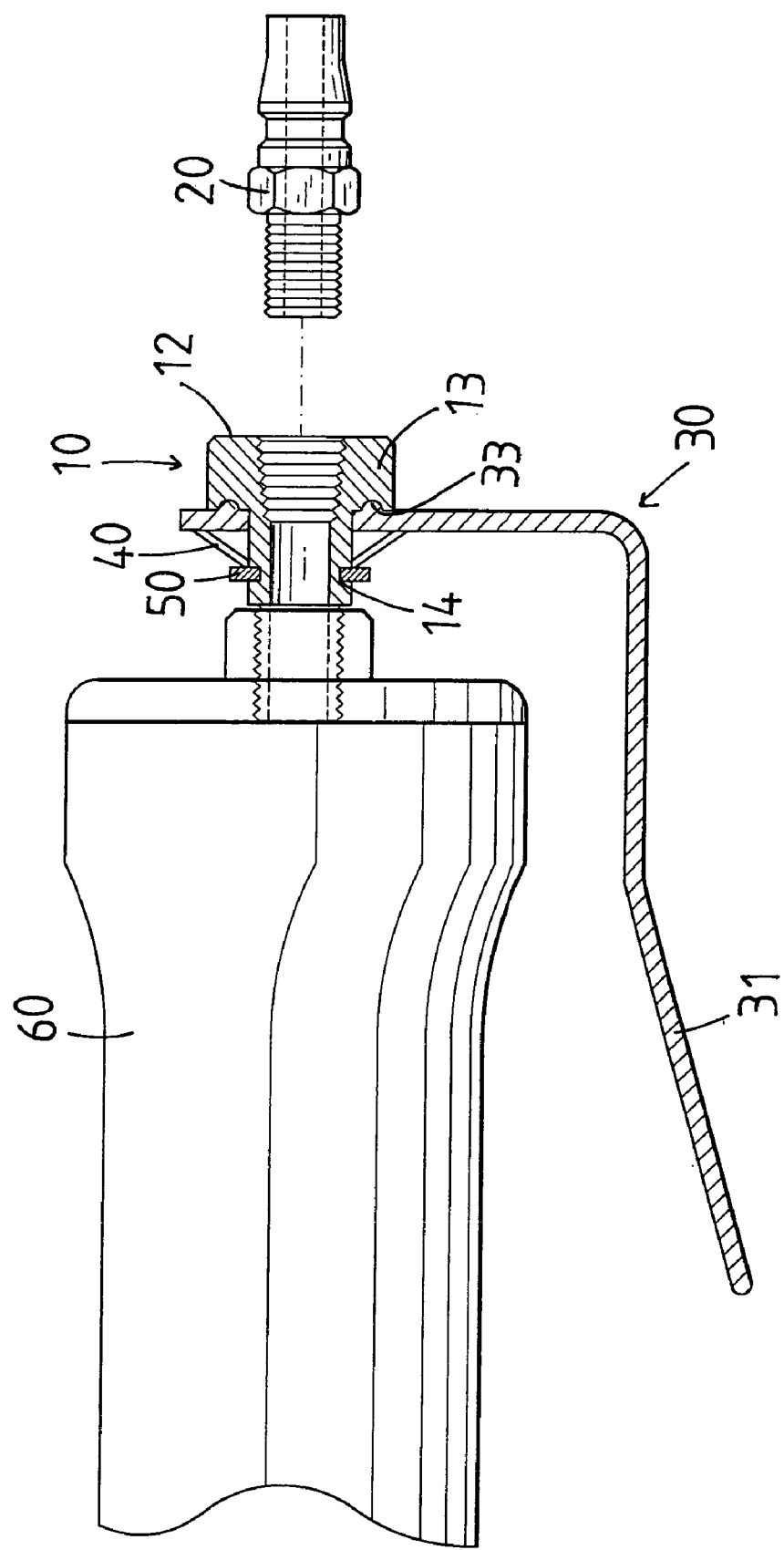
FIG. 3 is a partially cut-away plan cross-sectional view of the caulking gun as shown in FIG. 1.

Referring to the drawings and initially to FIGS. 1–3, a caulking gun in accordance with the preferred embodiment of the present invention comprises a gun body 60, a connector 10 secured on an end of the gun body 60, and a hanging hook 30 adjustably positioned on the connector 10.

The gun body 60 has an end face formed with a screw bore 62.

The connector 10 has a first end formed with a threaded rod 11 screwed into the screw bore 62 of the gun body 60 and a second end formed with an enlarged cylindrical connecting head 12. The threaded rod 11 of the connector 10 has an outer wall formed with an annular groove 14. The connecting head 12 of the connector 10 has a side formed with a plurality of positioning holes 13. Preferably, the positioning holes 13 of the connecting head 12 of the connector 10 are arranged in an annular manner.

The hanging hook 30 is substantially L-shaped, and has a first section formed with a positioning portion 32 mounted on the threaded rod 11 of the connector 10 and positioned on the connecting head 12 of the connector 10, and a second section formed with a suspension portion 31. The positioning portion 32 of the hanging hook 30 is formed with a through hole 34 mounted on the threaded rod 11 of the connector 10 and has a first side formed with a plurality of positioning bosses 33 each detachably locked in a respective one of the positioning holes 13 of the connecting head 12 of the connector 10. Preferably, the positioning bosses 33 of the hanging hook 30 are arranged in an annular manner and are surrounded around the through hole 34 of the hanging hook 30.

The caulking gun further comprises an elastic member 40 mounted on the threaded rod 11 of the connector 10 and having a first side urged on a second side of the positioning portion 32 of the hanging hook 30, and a C-shaped snap ring 50 locked in the annular groove 14 of the threaded rod 11 of the connector 10 and urged on a second side of the elastic member 40, so that the elastic member 40 is urged between the positioning portion 32 of the hanging hook 30 and the snap ring 50 so as to press the positioning portion 32 of the hanging hook 30 toward the connecting head 12 of the connector 10. Preferably, the elastic member 40 is a disk spring.

The caulking gun further comprises a quick connector 20 screwed into the connecting head 12 of the connector 10.

In practice, the suspension portion 31 of the hanging hook 30 is hooked on the user's waist belt or the workpiece when not in use. In operation, the positioning bosses 33 of the hanging hook 30 are detachably positioned in the positioning holes 13 of the connecting head 12 of the connector 10.

Thus, when the hanging hook 30 is rotated relative to the connector 10, each of the positioning bosses 33 of the hanging hook 30 is moved to detach from a respective one of the positioning holes 13 of the connector 10 and to compress the elastic member 40 and is then locked in an adjacent one of the positioning holes 13 of the connector 10 by the restoring force of the elastic member 40 so as to adjust the inclined angle of the suspension portion 31 of the hanging hook 30.

Accordingly, the angle and position of the suspension portion 31 of the hanging hook 30 can be adjusted arbitrarily so as to fit the user's practical requirement. In addition, the positioning bosses 33 of the hanging hook 30 are positioned in the positioning holes 13 of the connector 10, so that the hanging hook 30 is combined with the connector 10 rigidly and stably. Further, the hanging hook 30 is combined with the connector 10 easily and conveniently, thereby facilitating the user adjusting the angle and position of the suspension portion 31 of the hanging hook 30. Further, the connector 10 and the hanging hook 30 are mounted on the gun body 60 easily and conveniently, thereby facilitating the user mounting the parts.

Figure 4:
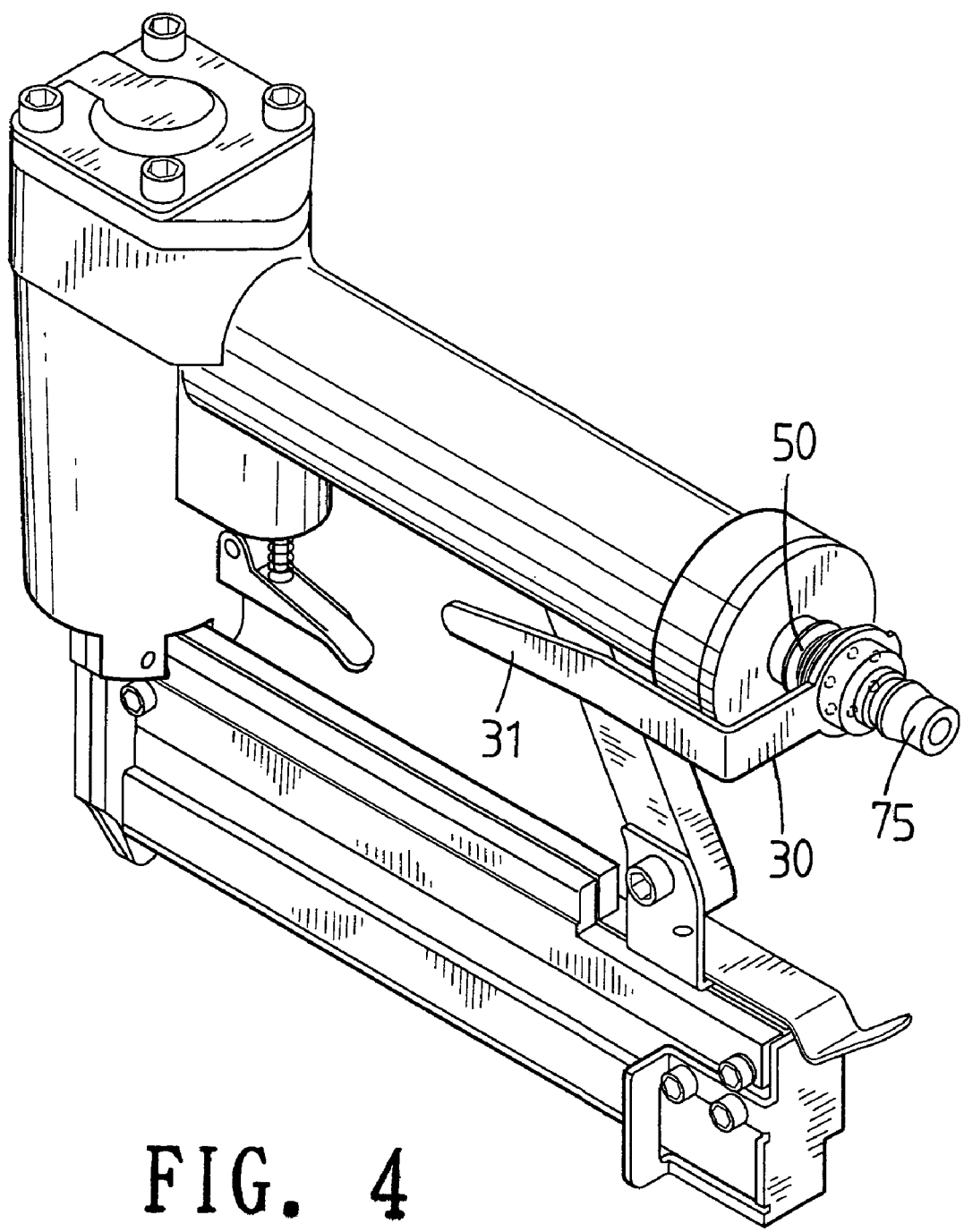
FIG. 4 is a perspective view of a caulking gun in accordance with another embodiment of the present invention.
Figure 5:
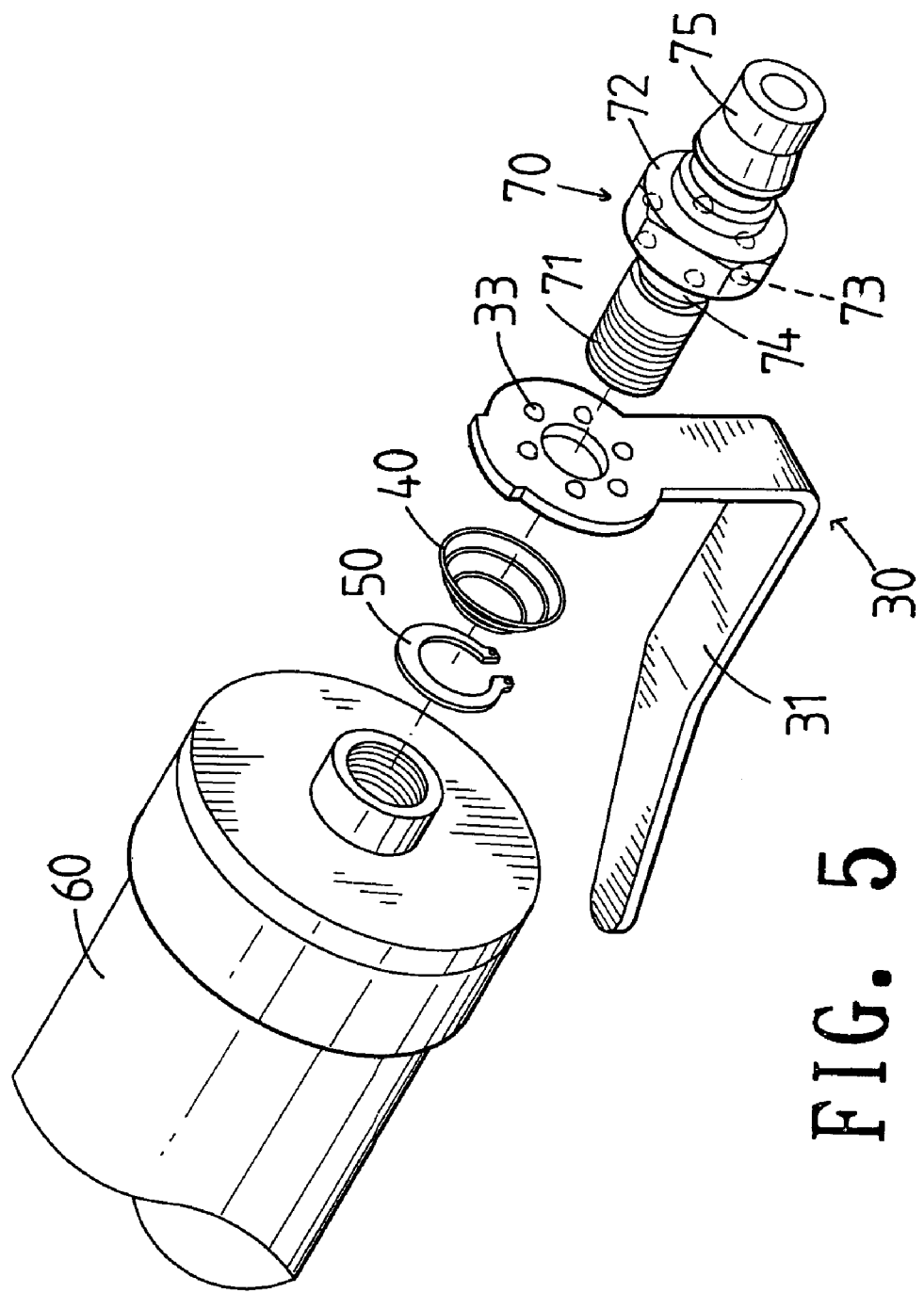
FIG. 5 is an exploded perspective view of the caulking gun as shown in FIG. 4.
Figure 6:
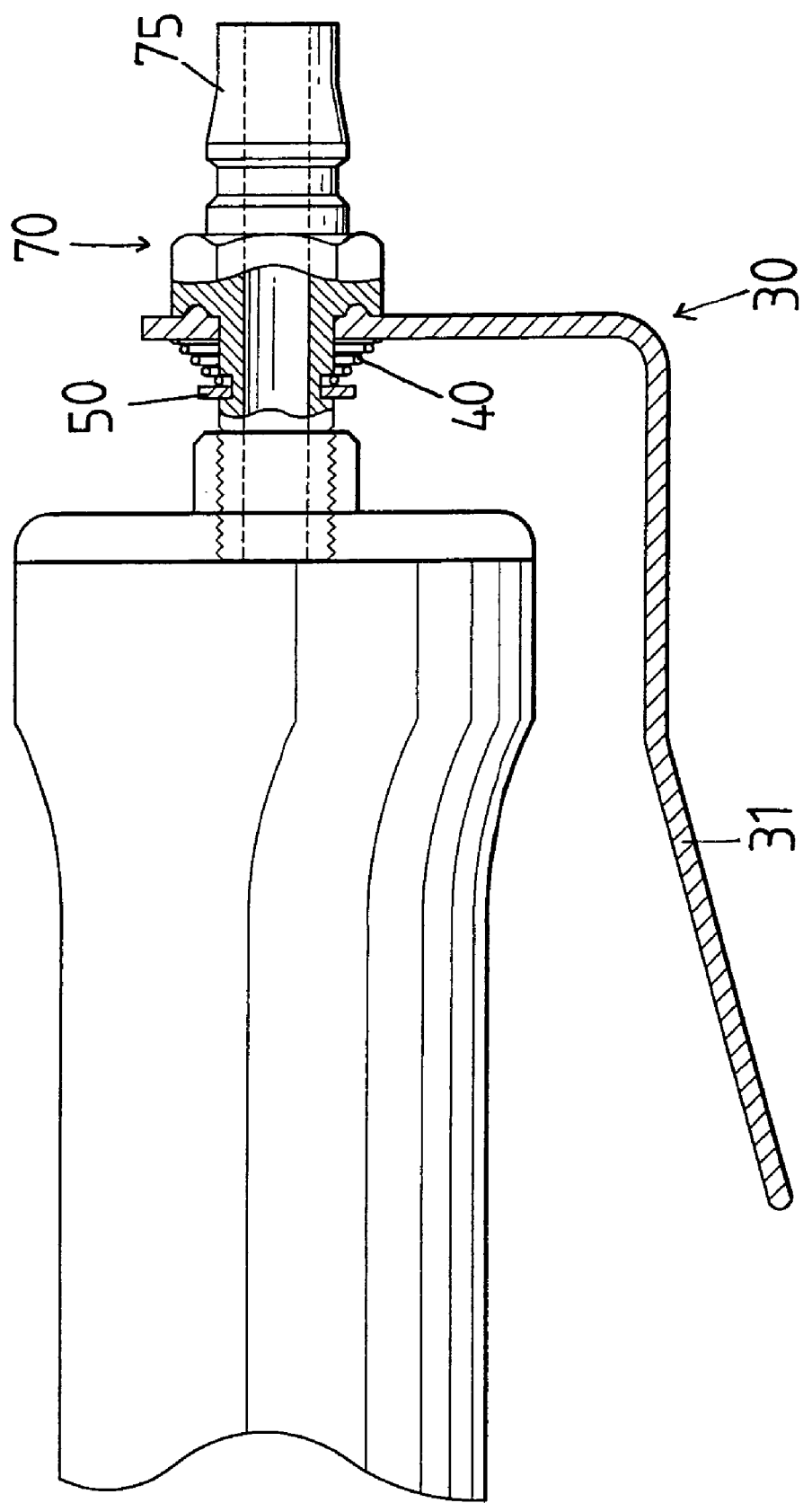
FIG. 6 is a partially cut-away plan cross-sectional view of the caulking gun as shown in FIG. 4.

Referring to FIGS. 4–6, a caulking gun in accordance with another embodiment of the present invention is shown, wherein the connector 70 has a first end formed with a threaded rod 71 and a second end formed with an enlarged connecting head 72. The threaded rod 71 of the connector 70 has an outer wall formed with an annular groove 74. The connecting head 72 of the connector 70 has a side formed with a plurality of positioning holes 73. The connecting head 72 of the connector 70 has an end integrally formed with a quick connector 75.

Figure 7:
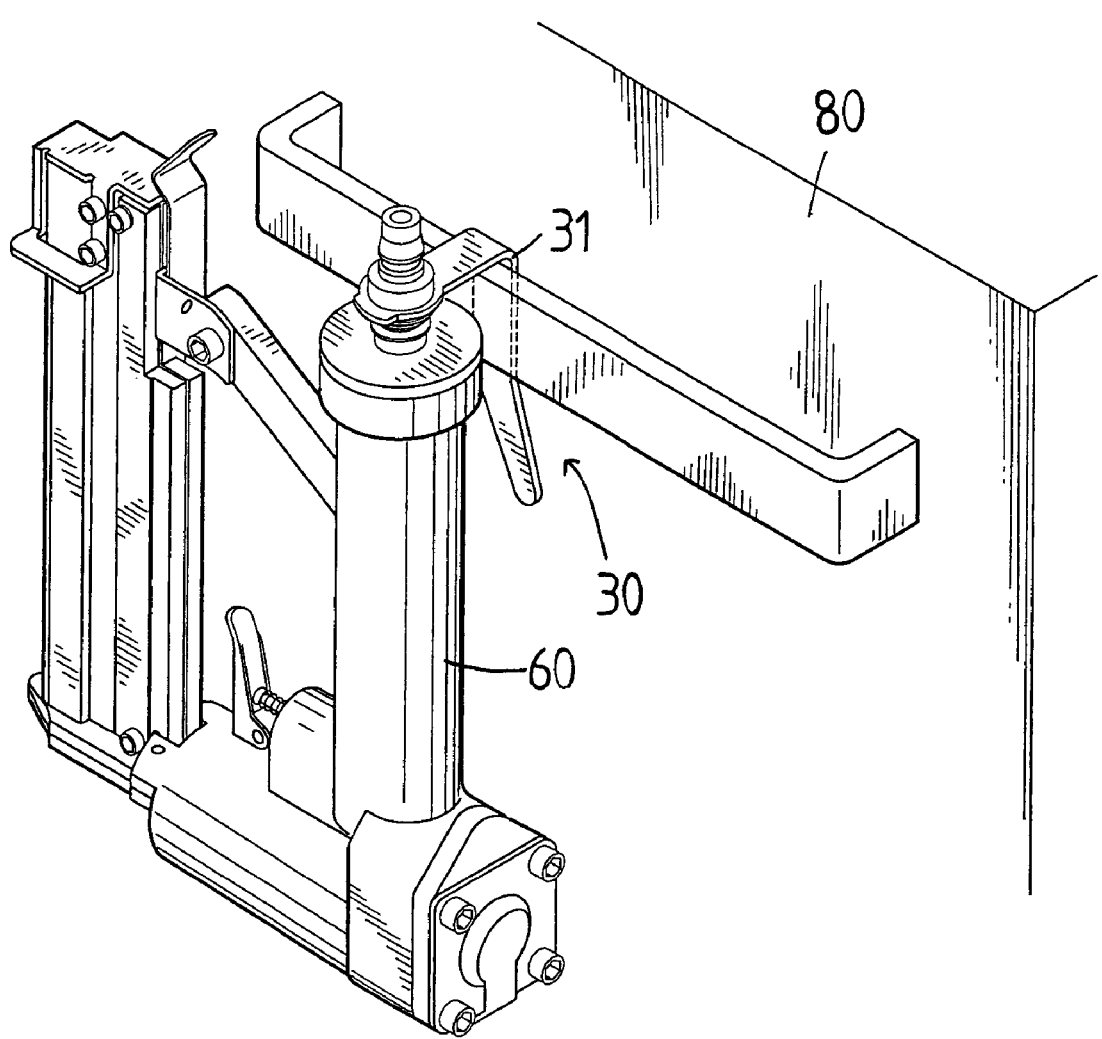
FIG. 7 is a perspective view showing usage of the caulking gun in accordance with the present invention.
Figure 8:
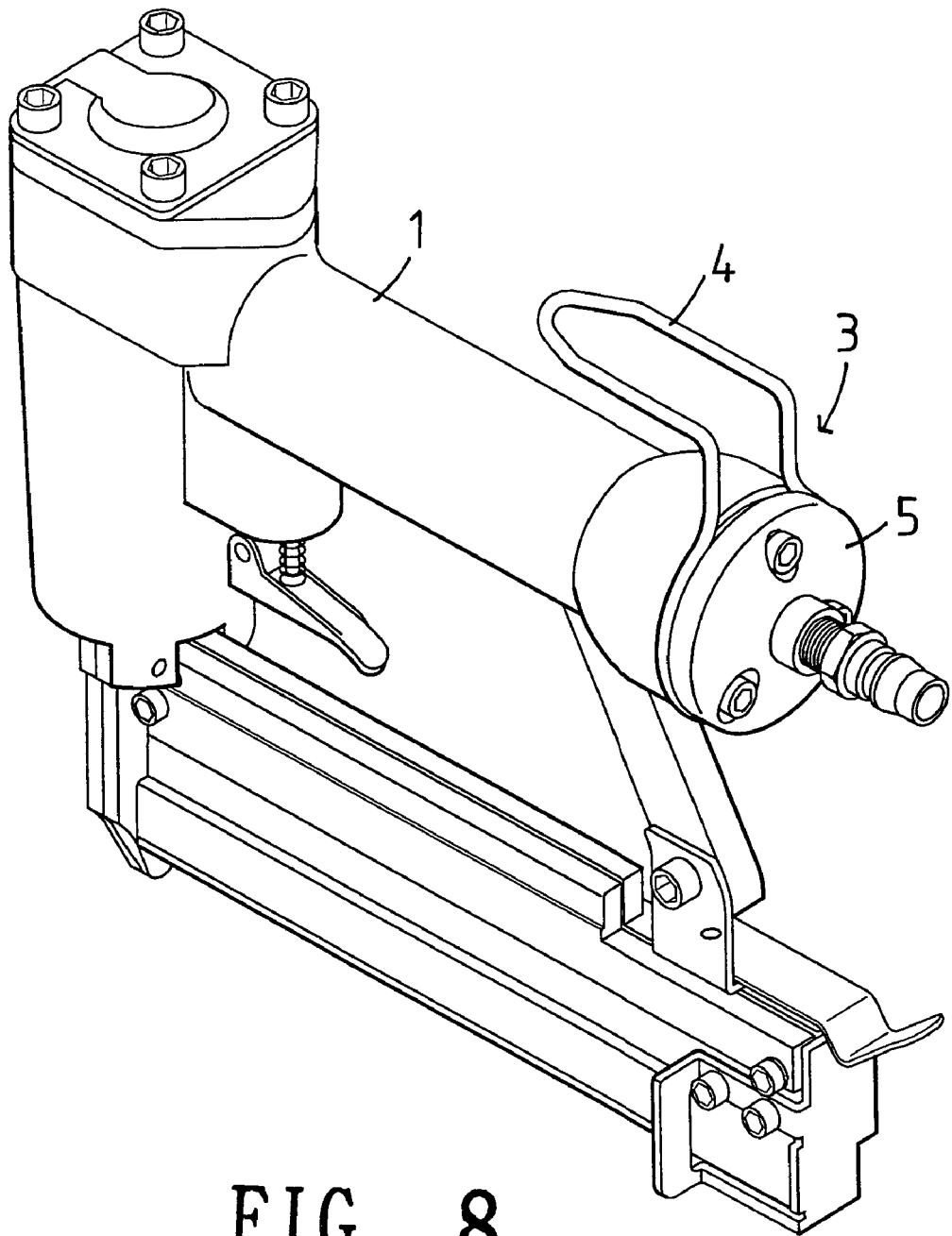
FIG. 8 is a perspective view of a conventional caulking gun in accordance with the prior art.
Figure 9:
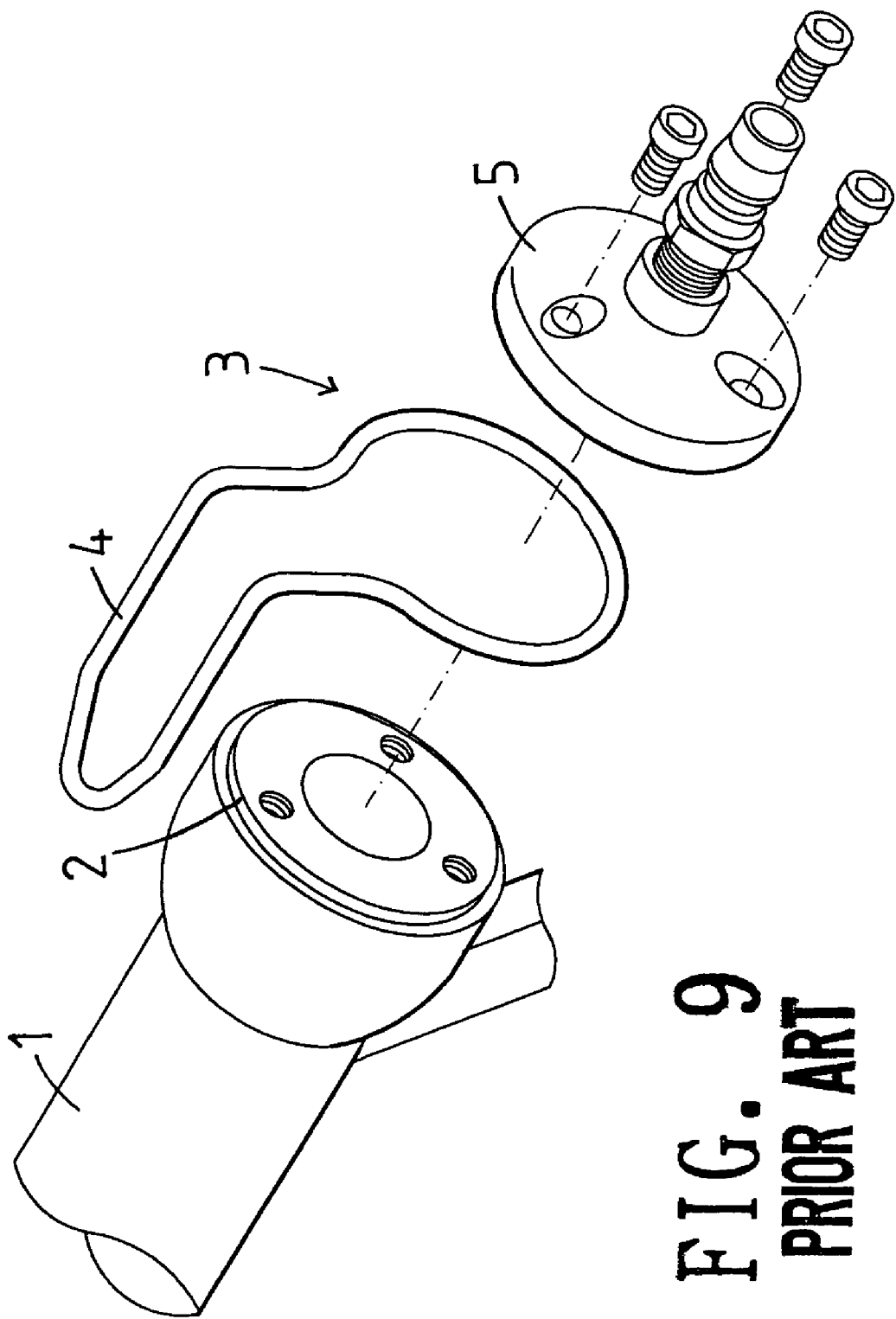
FIG. 9 is an exploded perspective view of the conventional caulking gun as shown in FIG. 8.

As shown in FIG. 7, the suspension portion 31 of the hanging hook 30 is suspended on an object 70.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A caulking gun, comprising: a gun body;
 a connector secured on an end of the gun body; and a hanging hook adjustably positioned on the connector;
 wherein the connector has a first end formed with a threaded rod secured on the gun body;
 wherein the connector has a second end formed with an enlarged connecting head, and hanging hook has a first section formed with a positioning portion mounted on the threaded rod of the connector and positioned on the connecting head of the connector; and
 wherein the connecting head of the connector has a side formed with a plurality of positioning holes, and the positioning portion of the hanging hook has a first side formed with a plurality of positioning bosses each detachably locked in a respective one of the positioning holes of the connecting head of the connector.

2. The caulking gun in accordance with claim 1, wherein the positioning holes of the connecting head of the connector are arranged in an annular manner.

3. The caulking gun in accordance with claim 1, wherein the positioning bosses of the hanging hook are arranged in an annular manner.

4. The caulking gun in accordance with claim 1, wherein the positioning portion of the hanging hook is formed with a through hole mounted on the threaded rod of the connector, and the positioning bosses of the hanging hook are surrounded around the through hole of the hanging hook.

5. A caulking gun, comprising: a gun body;
 a connector secured on an end of the gun body; and a hanging hook adjustably positioned on the connector;
 wherein the connector has a first end formed with a threaded rod secured on the gun body.
 wherein the connector has a second end formed with an enlarged connecting head, and hanging hook has a first section formed with a positioning portion mounted on the threaded rod of the connector and positioned on the connecting head of the connector; and
 further comprising an elastic member mounted on the threaded rod of the connector and having a first side urged on a second side of the positioning portion of the hanging hook, and a snap ring locked on the threaded rod of the connector and urged on a second side of the elastic member, so that the elastic member is urged between the positioning portion of the hanging hook and the snap ring so as to press the positioning portion of the hanging hook toward the connecting head of the connector.

6. The caulking gun in accordance with claim 5, wherein the threaded rod of the connector has an outer wall formed with an annular groove, and the snap ring is locked in the annular groove of the threaded rod of the connector.

7. The caulking gun in accordance with claim 5, wherein the elastic member is a disk spring.

* * * * *